April 2, 1940.  H. W. SMITH  2,196,155
DRAW BENCH
Filed May 22, 1937  8 Sheets-Sheet 1

INVENTOR.
HOWARD W. SMITH
BY
ATTORNEYS

April 2, 1940. H. W. SMITH 2,196,155
DRAW BENCH
Filed May 22, 1937  8 Sheets-Sheet 2

INVENTOR.
HOWARD W. SMITH
BY Richey & Watts
ATTORNEYS

April 2, 1940.   H. W. SMITH   2,196,155
DRAW BENCH
Filed May 22, 1937   8 Sheets-Sheet 6

INVENTOR.
HOWARD W. SMITH
BY Richey & Watts
ATTORNEYS

April 2, 1940.                H. W. SMITH                 2,196,155
                              DRAW BENCH
                         Filed May 22, 1937              8 Sheets-Sheet 8

INVENTOR.
HOWARD W. SMITH
BY Richey & Watts
ATTORNEYS

Patented Apr. 2, 1940

2,196,155

UNITED STATES PATENT OFFICE 2,196,155

DRAW BENCH

Howard W. Smith, Ellwood City, Pa., assignor to The Aetna Standard Engineering Company, Youngstown, Ohio, a corporation of Ohio Application May 22, 1937, Serial No. 144,195

11 Claims. (Cl. 205—7)

This invention relates to apparatus for drawing metallic articles and more particularly to an improved draw bench for drawing metal tubes over a mandrel and through a die.

Tube draw benches have been built and used in which a plurality of mandrels are provided together with means for feeding a tube over one mandrel while another tube is being drawn through the die over the other mandrel. This arrangement saves a great deal of time in the operation of the apparatus and greatly increases the output of the draw bench. It is the object of the present invention to provide an improved form of multi-mandrel draw bench in which simple and effective means are provided for moving the mandrels from loading to drawing position and vice versa.

Further objects of the invention are the provision of an effective means for loading or feeding a tube onto a mandrel preparatory to the drawing operation; means for moving the mandrels into and out of their drawing position in the die; and mandrel supports whereby mandrels may easily be changed and the locations thereof relative to the die readily controlled by the operator.

Other objects of my invention will appear from the following description of one embodiment thereof, reference being had to the accompanying drawings, in which—

Figure 1:
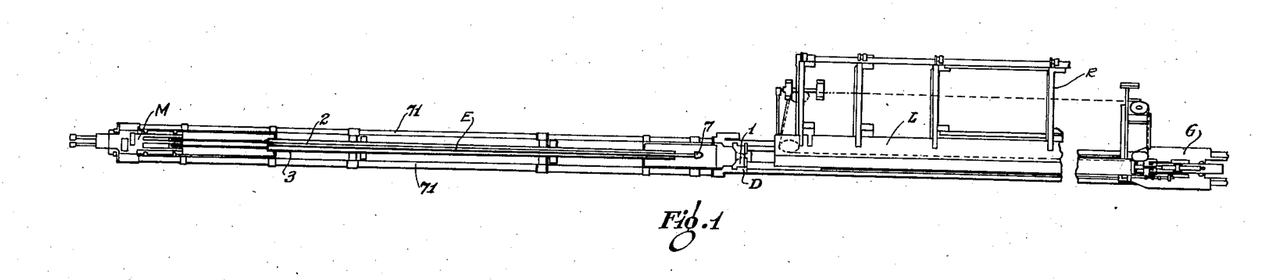
Figure 1 is a plan view of my improved draw bench including the mandrel operating and tube loading mechanism.
Figure 2:
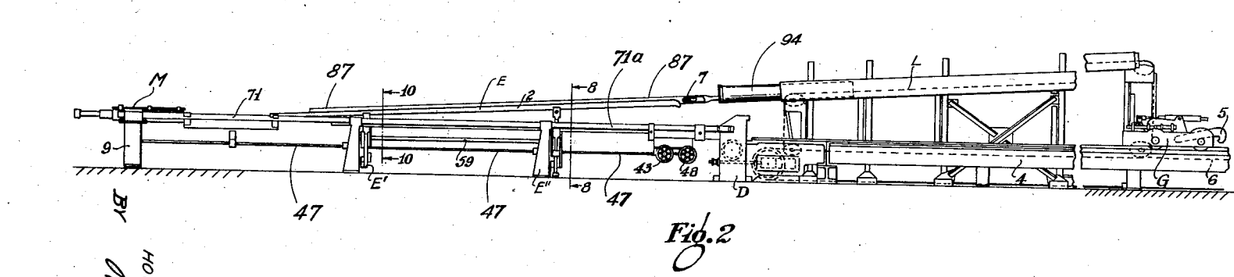
Figure 2 is a side elevation of the draw bench shown in Figure 1.
Figure 3:
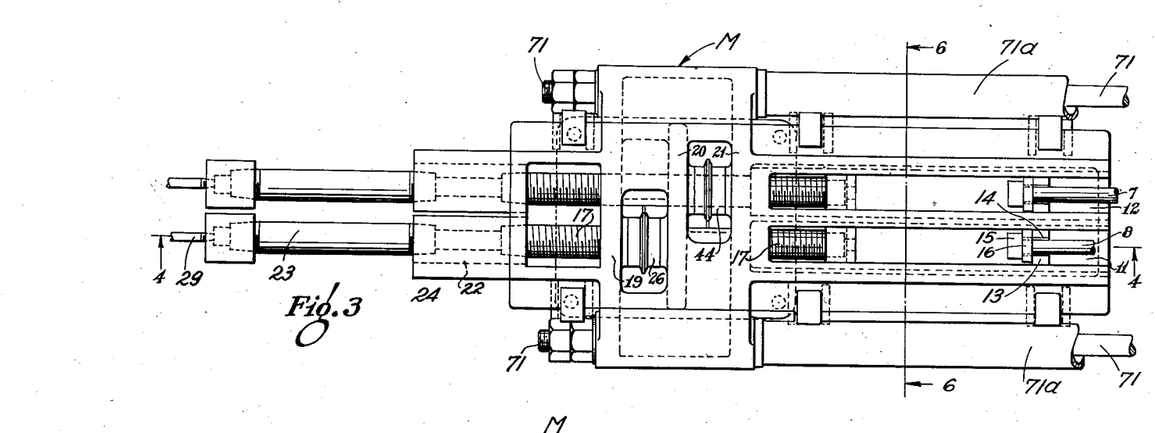
Figure 3 is an enlarged fragmentary plan view of the mandrel supporting and operating end of the machine.

Referring to Figures 1 and 2, the draw bench mechanism includes a suitable die supporting section D in which a die 1 of the proper contour and size may be disposed and the mandrel supporting and operating section M, which supports the outer ends of the two mandrel rods and is adapted to move them toward and away from the die section D, as will be later described. Between the mandrel section M and die section D is disposed the mandrel elevating mechanism E which includes a pair of angle troughs 2 and 3 and the lifting and lowering devices which may be generally indicated at E′ and E″.

On the opposite side of the die section D from the mandrels is disposed the tube carrying rack R and the tube feeding or loading mechanism L which is adapted to push tubes from the rack R over an elevated mandrel which is supported by one of the mandrel troughs 2 or 3. The frame 4 of the draw bench includes a track for the tube gripping buggy G, which is adapted to grip the end of the tube which extends through the die 1 and which includes a hook member 5 for engaging a chain 6 which will move the gripping buggy G away from the die, thus drawing the tube through the die and over the mandrel in the usual fashion. As this gripping buggy G forms no part of the present invention it will not be necessary to describe it here other than to state that it is preferably of the type which includes jaws which automatically grip the end of the tube and means for causing the hook 5 to drop into and be lifted out of engagement with the actuating chain 6.

Before describing in detail the various elements of my machine it will be advisable to explain the general mode of operation. It may be assumed that a number of tubes of the size and length being drawn are disposed on the rack R. As will be later explained this rack R includes mechanism for feeding the tubes into the tube feeding or loading device L from which they may be fed on to the mandrels which lie in and are supported by the troughs 2 and 3. As is seen in Figure 2 the trough 2 is in elevated position and the mandrel rod 7, supported by trough 2, is aligned with the tube loading device L so that a tube may be pushed thereover. While this is being done another tube, which has previously been loaded onto the other mandrel 8, is being drawing through the die 1 by the grip buggy G. After this drawing operation is completed the trough 2 is lowered, in manner and by means to be later described, and the trough 3 is elevated. The mandrel 7 and its tube will now be in drawing position while the other mandrel 8 will be in elevated or loading position. The mandrel operating mechanism M is controlled by the operator to move the ends of the mandrel into and out of drawing position in the die 1 and this operation may conveniently be effected by fluid pressure operated mechanism.

Referring now particularly to Figures 3, 4, 5, 6 and 7, the mandrel operating mechanism whereby the outer ends of the mandrel rods 7 and 8 are supported and the mandrels are moved toward and away from the die 1 comprises a pair of substantially identical mechanisms each adapted to operate one of the mandrel rods. It will thus be unnecessary to describe each mandrel operating mechanism separately, as, to a large degree, they are made up of identical parts. A supporting frame 9 is adapted to carry the mandrel anchor and cylinder supporting member 10 at the proper height above the floor. This anchor 10 is provided with slots 11 and 12 in which, referring to the slot 11, an adjustable mandrel guide and retaining member 13 is disposed. This adjustable guide is adapted to be moved longitudinally in the slot 11 and is provided with a notched end portion 14 in which the mandrel rod 8 lies. The rod 8 is provided at its end with an enlarged head 15 and a collar 16 centers the rod in the slot 11. The opposite end of the guide 13 is secured to the end of the tubular threaded barrel member 17 by means of a screw thread and a set screw 18. The threaded barrel 17 extends through, but does not contact with, the portions 19, 20 and 21 of the mandrel anchor and cylinder support member 10. The left hand end (Fig. 4) of the threaded member 17 is secured to the hollow connecting sleeve 22 and the cylinder 23 is secured to the other end of the sleeve 22. This sleeve 22 is supported by the portion 24 of the member 10 and is keyed thereto, as indicated at 25, so that longitudinal movement of the cylinder 23, the connecting sleeve 22, the threaded sleeve 17 and the adjustable guide 13 is permitted relative to the supporting member 10 but rotary movement of this assembly relative to the support member 10, is prevented.

Figures 4, 5:
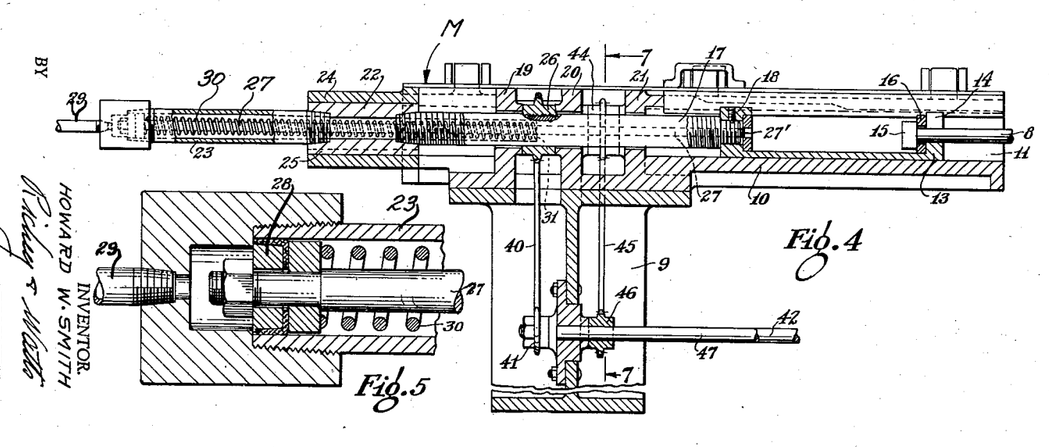
Figure 4 is a vertical section taken on line 4—4 of Figure 3.
Figure 5 is an enlarged fragmentary view of a mandrel operating piston.

The longitudinal movement of the assembly of parts just enumerated is effected by means of an internally threaded sprocket member 26 which has threaded engagement with the sleeve 17 and which is supported and prevented from longitudinal movement by thrust faces on the portions 19 and 20 of the support 10. It will be seen that when the sprocket 26 is rotated the entire assembly of the cylinder 23, sleeve 22, sleeve 17 and guide member 13 will be moved longitudinally. This movement will change the position of the right hand stop portion 14 of the guide 13 and thus will change the limit of movement of the mandrel rod 8 toward the die.

As seen in Figure 4 the rod 8 is in its drawing position with the head 15 abutting the stop 14. If it is desired to change the drawing position of the mandrel toward or away from the die it is only necessary to turn the sprocket 26 the proper amount in the proper direction. Extending through the hollow center of the above noted mandrel locating assembly is a rod 27 which, as best seen in Figure 5, carries a piston member 28 on its outer end. This piston is adapted to move in the cylinder 23 which is connected by means of a suitable conduit 29 to a source of fluid under pressure (not shown). A coil spring 30, normally maintained under compression, is disposed between the piston 28 and a shoulder 31 on the bore of the threaded sleeve 17. When fluid under suitable pressure is delivered to the cylinder 23 on the left hand side of the piston 28 the piston 28 and the rod 27 will be moved to the right and the end 27' of the rod will engage the head 15 of the mandrel rod 8 and move it to the right into its drawing position engaging the stop 14. In Figure 4 this operation has taken place and the supply of fluid under pressure has been released and the cylinder vented by a suitable valve (not shown). The spring 30 will return the piston 28 and the rod 27 from their advanced position to their withdrawn position, which is illustrated in Figures 4 and 5.

In the operation of the machine, after a tube has been placed on the mandrel rod and the mandrel aligned with the die, which operations take place when the rod 8 is in its withdrawn position and the head 15 thereof is back against the left hand end 18 of the guide 13 (Figure 4), fluid pressure is applied to the piston 28 and it is moved forward with the rod 27 which engages the head 15 of the mandrel rod 8 and pushes the mandrel rod 8 forward into drawing position in the die. After the tube is drawn through the die the mandrel rod 8 may be manually returned by the operator to its loading position with the end 15 abutting the left hand end of the guide 13. The slotted stop end 14 of the guide 13 permits the necessary vertical movement of the mandrel rod 8 to take place while still providing an effective adjustable limit or stop to its movement toward the die.

Figures 6, 7:
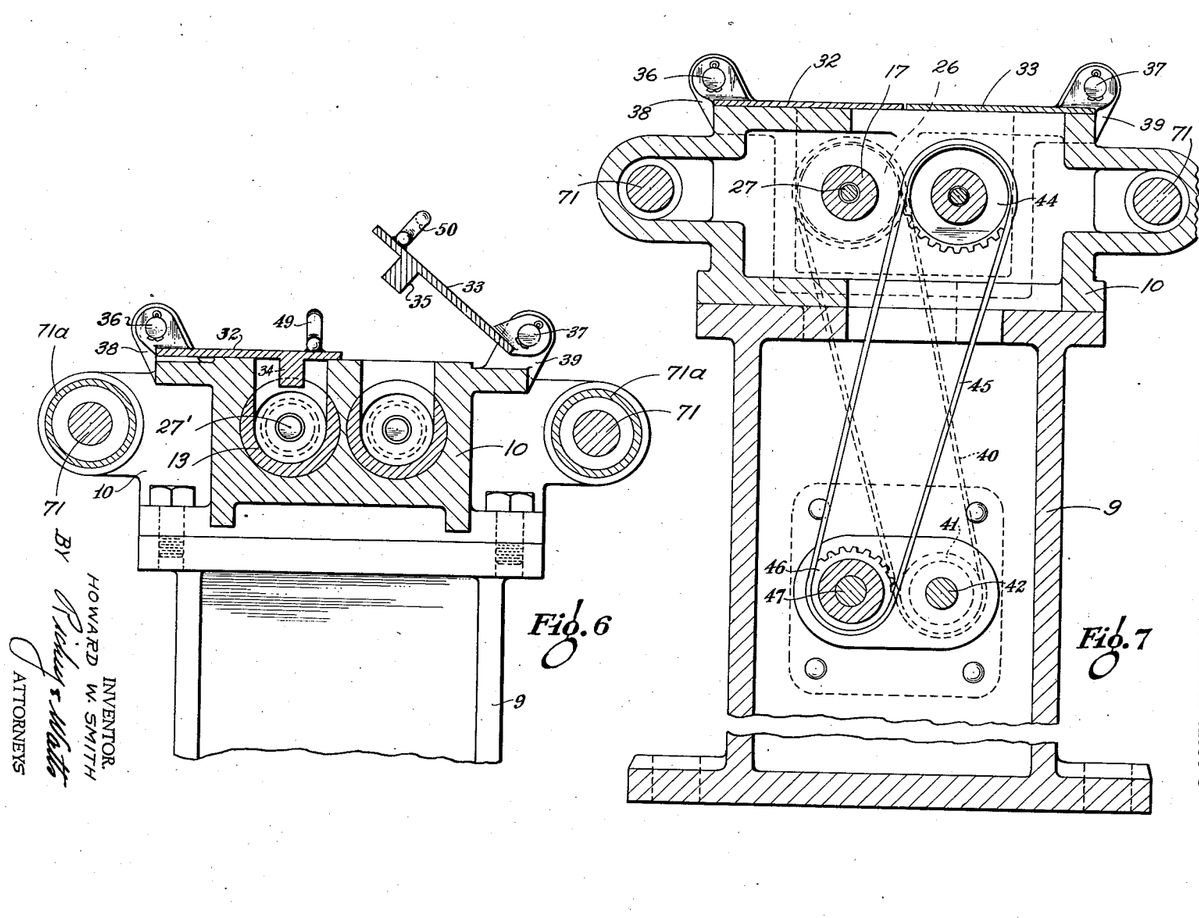
Figure 6 is an enlarged fragmentary vertical cross-section taken on line 6—6 of Figure 3.
Figure 7 is an enlarged cross-section taken on line 7—7 of Figure 4.

In order to keep the mandrel rods 7 and 8 from jumping out of the slots in the guide members 13 hinged covers 32 and 33 are provided (see Figure 6). These covers have downwardly extending projections 34 and 35 which are adapted to engage the sleeve 16 and thus prevent undesired vertical movement of the ends of the mandrel rods. The mandrel rod retaining cover members 32 and 33 are hinged at 36 and 37 respectively to brackets 38 and 39 which extend upwardly from the bed 10 and are provided with handles 49 and 50. By providing the arrangement described for supporting the ends of the mandrel rods 7 and 8 they are held securely in position during operation of the apparatus but may very readily be removed when it is desired to change mandrels.

A chain 40 engages the sprocket 26 and passes downwardly around a sprocket 41 which is secured to the end of the shaft 42. This shaft 42 is adapted to be operated by the hand wheel 43 (see Figure 2) and it will be seen that rotation of this shaft will cause corresponding movement of the adjustable guide member 13 thus varying the position of the limiting end portion 14 to control the inner or drawing position of the mandrel.

Although the above description has applied particularly to the mandrel rod 8 it will be understood that the apparatus used for operating the mandrel rod 7 is substantially identical. It should be noted, however, that a sprocket 44 is provided for operating the adjusting mechanism for the mandrel rod 7 and that the sprocket 44 is offset from the sprocket 26 and is disposed between the portions 20 and 21 of the bed frame 10. A chain 45 extends downwardly from the sprocket 44 to a sprocket 46 (see Figures 4 and 7) secured to a shaft 47 which in turn is connected to be rotated by the hand wheel 48 (see Figure 2.) Thus, it will be seen that the operator, from his position adjacent the die stand D, may adjust the drawing position of each of the mandrel rods 7 and 8 by merely rotating the hand wheels 43 and 48 in the proper direction. The control valves (not shown) for the mandrel operating pistons may conveniently be located at the operator's position adjacent the die stand D. As the hand wheels 43 and 48 which are adapted to adjust the position of the stops which control the drawing location of the mandrels are also located adjacent the die stand D, and (as will later appear) as the controls for the tube feeding mechanism and the grip buggy are also at the operator's position, the entire draw bench may be controlled by a single operator.

In order to lift and lower the mandrel rods 7 and 8 to and from their loading and drawing positions I provide an elevator mechanism generally indicated at E in Figures 1 and 2. This part of my draw bench is illustrated in detail in Figures 8, 9, 10 and 11 and includes the angle mandrel rod and tube supporting members 2 and 3 and the elevators E' and E''. These elevator mechanisms E' and E'' are substantially the same in their structural elements and mode of operation but the elevator E'' has a greater lift than the elevator E'. This is clearly seen in Figure 2.

Figure 8:
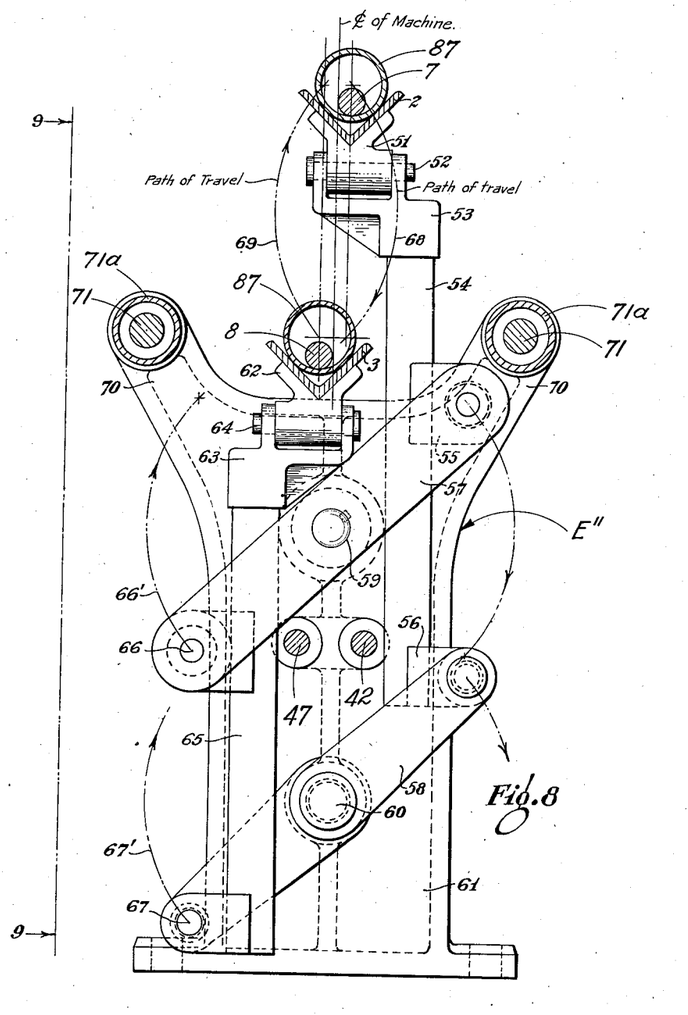
Figure 8 is an enlarged cross-sectional view taken approximately at line 8—8 of Figure 2 and illustrating the mandrel lifting and lowering mechanism.
Figure 9:
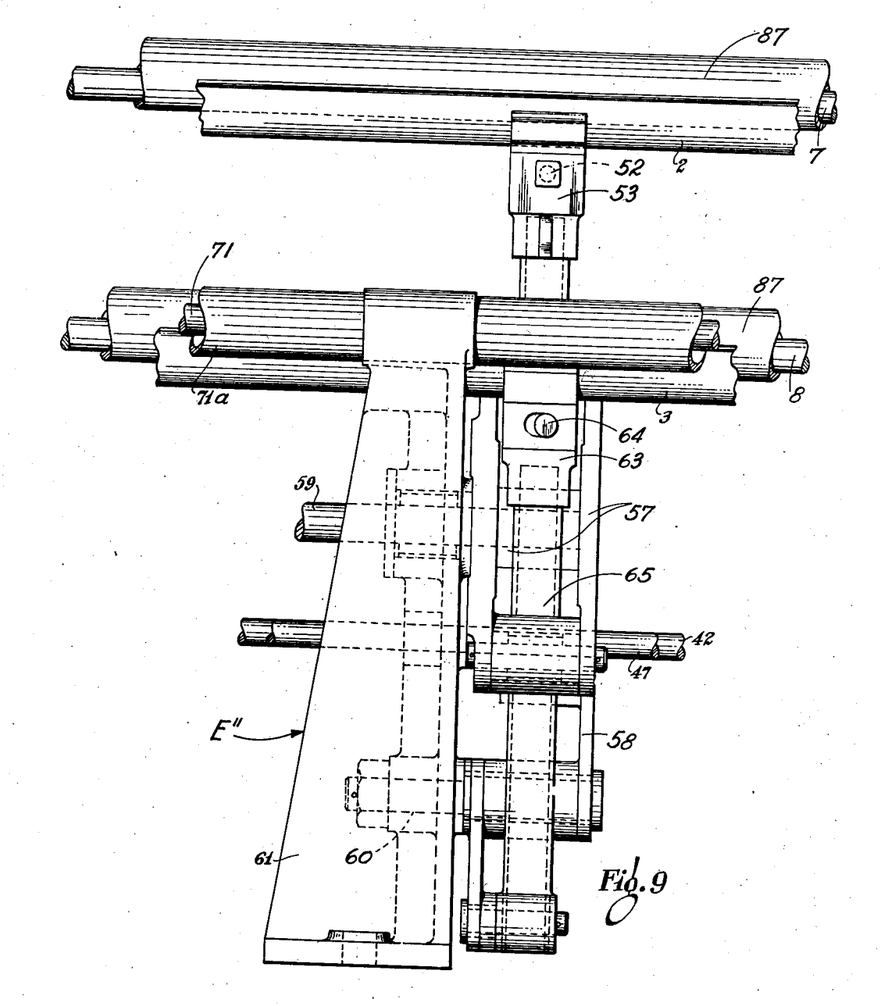
Figure 9 is a side elevation of the mandrel lifting and lowering mechanism shown in Figure 8 and may be considered to be taken approximately on line 9—9 of Figure 8.

Referring to Figures 8 and 9, which illustrate the elevator mechanism E'', the mandrel rod and tube supporting angle 2 is mounted on a bracket 51 which in turn is removably secured by means of the pin 52 to the upper end bracket 53 of the vertical support 54. This vertical support member 54 carries bearing brackets 55 and 56 which in turn are pivotally attached to the outer ends of the oscillating arms 57 and 58 respectively. The arm 57 is keyed at its center to the shaft 59 while the arm 58 has a bearing at its center on a stub shaft 60 which is mounted in the base or frame 61, as is clearly seen in Figure 9.

The tube and mandrel rod supporting member 3 is mounted in the same manner as the support 2, being secured to the bracket 62 which in turn is attached to the bracket 63 by a pin 64. The bracket 63 is secured to the vertically extending bar 65 which has pivotal connection at 66 and 67 with the lower ends (Figure 8) of the oscillating arms 57 and 58 respectively.

As illustrated in Figures 2, 8 and 9, the support 2 is in its uppermost position and is adapted to support the mandrel rod in position for feeding a tube thereover. The supporting angle 3 is in its bottom or drawing position and is adapted to support a tube in alignment with the die 1 during the drawing operation. When it is desired to reverse the positions of the supports 2 and 3 it is only necessary for the operator to release a suitable latch mechanism (not shown), whereupon (it being understood that the lower angle support 3 is empty, its tube having been drawn through the die) the force of gravity will cause the angle support 2 together with the tube carried thereby to move downwardly through the arcuate path indicated by the dot-dash line 68 in Figure 8. This downward movement will occur due to the fact that the parts, when not loaded with tubes, will be balanced and when a tube is disposed in the upper angle support and none in the lower the weight of the tube will operate the mechanism. Due to the arrangement of the supporting arms 57 and 58 the downward movement of the support 2 will cause a corresponding upward movement of the support 3 and the longitudinal center line of the tube which is carried thereby will move upwardly through the oppositely arcuate (as compared to path 68) dot-dash line path indicated at 69 in Figure 8. The parts are so designed and proportioned that this reversal of positions and lifting and lowering of the angle supports 2 and 3 will take place without interference. The path of the point 66 during this movement is indicated in dot-dash lines at 66' while the path of the point 67 is indicated in dot-dash lines at 67'.

Figure 10:
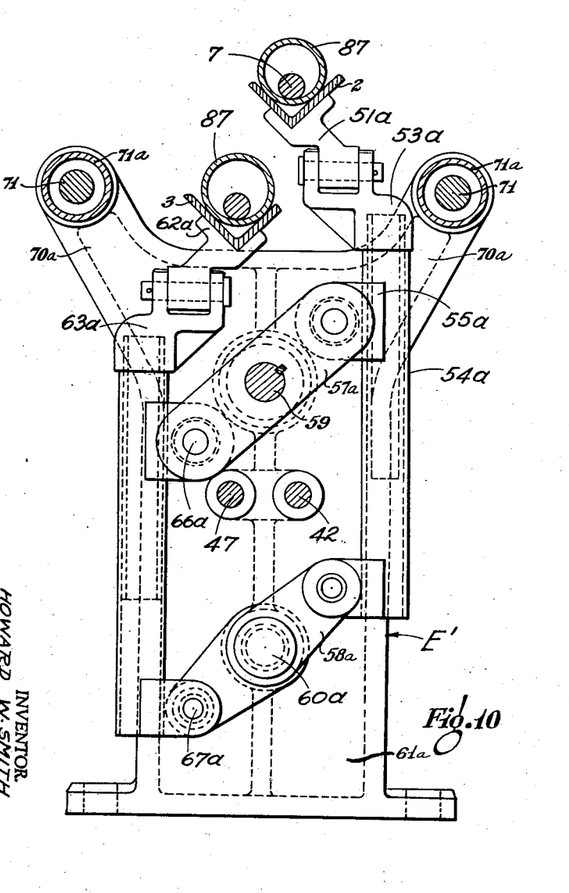
Figure 10 is a cross-section generally similar to Figure 8 but illustrating the mandrel lifting mechanism at a point further removed from the die than that shown in Figure 8.
Figure 11:
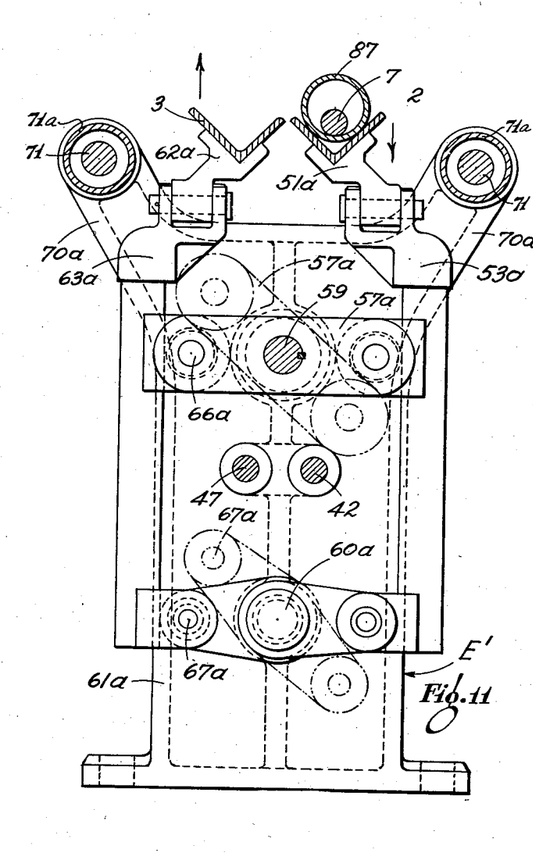
Figure 11 is a view similar to Figure 10 but illustrating the mandrel elevators in their mid-positions.

The elevator mechanism E' is the same in its elements as that just described and the parts in Figures 10 and 11 of the drawings have been given the same reference numerals with the addition of the character $a$. The principal difference between the two elevator devices is that in the elevator E' the oscillating arms 57a and 58a are shorter thus providing less lift than that given by the elevator E''. In Figure 10 the parts of the elevator E' are illustrated in the positions which they assume when the elevator E'' is in the position shown in Figure 8, i. e., when the angle support 2 is in its uppermost or loading position and the angle support 3 in its lower or drawing position. In Figure 11 the elevator E' is illustrated in its mid position to show the clearance between the supports 2 and 3 which permits them to pass as they are raised and lowered. The shaft 59 carries both the oscillating arm 57 and the oscillating arm 57a. By extending this shaft between the two elevator devices E' and E'' these two mechanisms are interlocked so that they must operate simultaneously and so that their corresponding parts will always be in the same relative positions. The supporting frames 61 and 61a each include upwardly extending portions 70 and 70a in which the members 71 are secured. Tubular spacers 71a enclose the connecting rods 71. As is seen in Figures 1 and 2 these members 71 connect the various supporting frame members of the draw bench, extending from the die section D to the mandrel operating and supporting section M.

Figure 12:
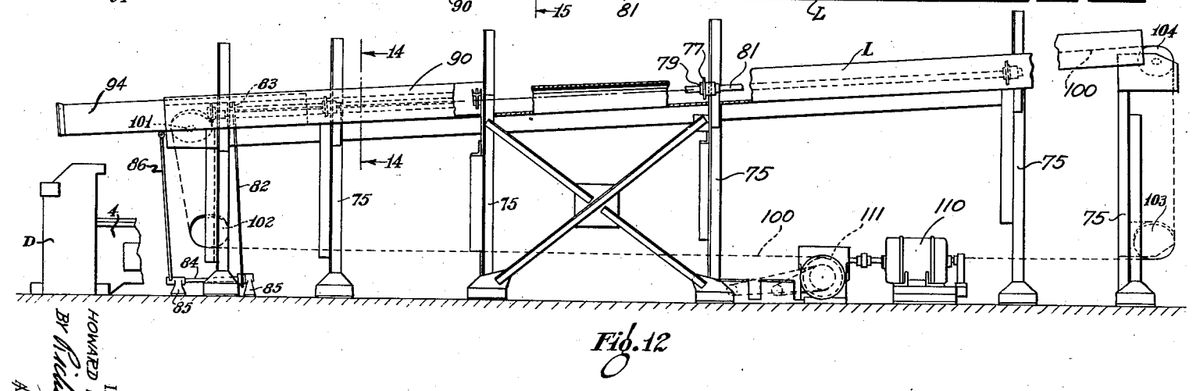
Figure 12 is an enlarged side elevation of the loading mechanism L and tube rack R.
Figure 13:
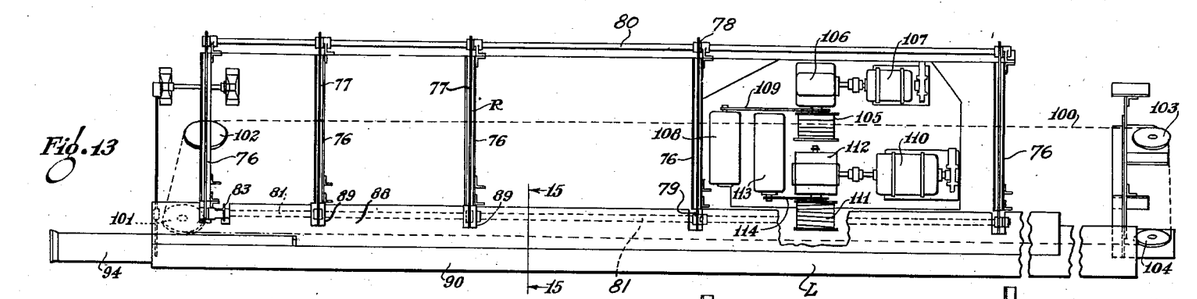
Figure 13 is a plan view of the apparatus shown in Figure 12.

Figures 12 and 13 illustrate the mechanism which is adapted to feed the tubes into loading position over the end of the elevated mandrel and mandrel rod and to push the tubes over the mandrel into position where they may be dropped into drawing alignment with the die D. The rack R for supporting tubes includes vertical columns 75 and transversely extending chain supporting members 76. These transverse members 76 form a surface on which the tubes rest before they are fed to the loading mechanism. Chains 77 (see Figures 13 and 14) extend around suitable sprockets 78 and 79 which are keyed to shafts 80 and 81 respectively. A vertically extending drive chain 82 extends from a suitable sprocket 83 on the shaft 81 downwardly to a sprocket keyed to the shaft 84. As is seen in Figure 12 this shaft 84 is supported by suitable brackets 85 and is provided with an upwardly extending operating handle 86.

The pipes which are to be fed over the mandrel rods rest upon the chains 77 which in turn are supported by the transverse members 76. When the operator moves the handle or lever 86 the shaft 84 is rotated and a corresponding rotary movement is imparted to the shaft 81 by the chain 82. When the shaft 81 rotates each of the chains 77 will be moved and thus each of the pipes 87 (Figure 14) will be moved a certain distance across the supporting rack.

A table or platform 88 is supported by suitable framework over the shaft 81 and is notched out as seen at 89 in Figure 13 to accommodate the chains 77 and sprockets 79. It will be understood that the above described movement of the lever 86 will cause the tubes 87 to be transferred one at a time from the chains 77 to the table 88.

Figure 14:
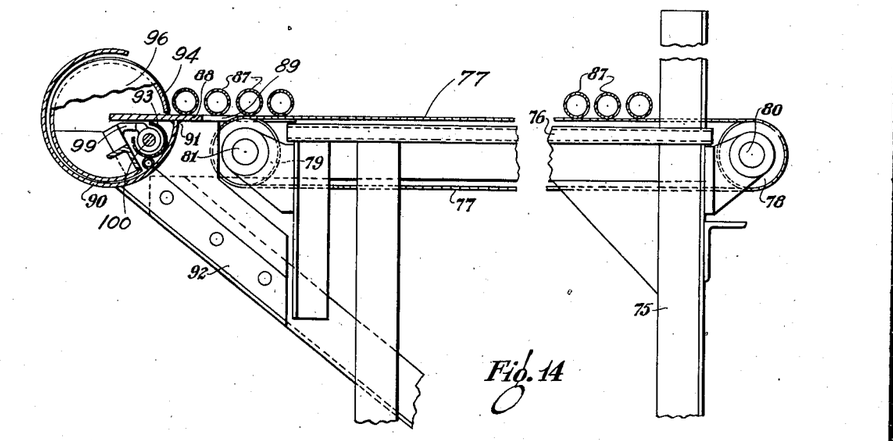
Figure 14 is an enlarged vertical cross-section taken substantially on line 14—14 of Figure 12.
Figures 15, 16, 17:
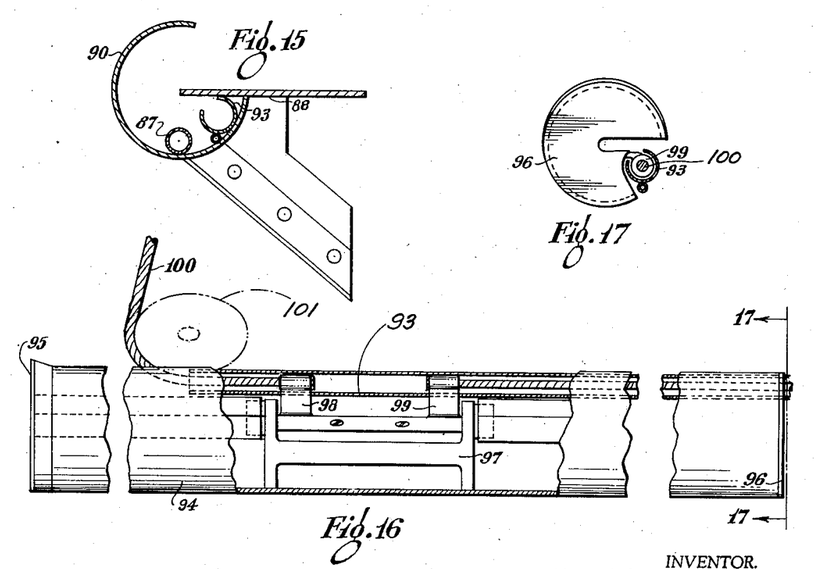
Figure 15 is a fragmentary view of the loading barrel taken on line 15—15 of Figure 13.
Figure 16 is an enlarged view of the tube pushing plunger, partly broken away to illustrate the cable attaching arrangement.
Figure 17 is a sectional view taken on line 17—17 of Figure 16.

The loading barrel 90 comprises an elongated tubular member having a portion cut away throughout substantially its entire length. This barrel is preferably secured to the table 88 by welding, as is seen at 91 in Figure 14, and is further supported by the angle bracket members 92. Referring to Figures 14 and 15 it will be seen that a tubular cable guide 93 is welded in position within the barrel 90 and below the table 88. This tubular cable guide is also provided with a side opening along its length and extends for the major portion of the length of the barrel 90. The tubes 87 which are fed on to the table 88 by the moving chains 77 are moved over, one at a time, until they drop off the edge of the table 88 into the barrel 90 where they assume the position shown in Figure 15.

In order to move the tubes out of the barrel 90 and over the mandrel and mandrel rod I provide a movable plunger or ram, best seen in Figure 16, which comprises a generally cylindrical shell 94, closed at both ends by suitable plates 95 and 96 which are cut away as seen in Figure 17 to fit around the table 88 and the cable guide tube 93. Within the tubular body 94 of the plunger is disposed the cable anchoring frame 97. This frame may be secured to the inner walls of the plunger 94 in any suitable manner and is provided with outwardly extending cable anchoring and plunger guiding members 98 and 99. These guide members 98 and 99 are adapted to fit into the cable tube 93 and thus prevent rotation of the plunger 94 relative to the barrel 90 while permitting the plunger to slide freely in the barrel.

The necessary reciprocation of the plunger 94 in the barrel 90 is effected by means of a cable or chain 100 which is secured at its ends in the cable retaining members 98 and 99 of the plunger 94. This cable 100, as is best seen in Figures 12 and 13, extends around sheaves or pulleys 101, 102, 103 and 104. Between the pulleys 101 and 104 the cable passes through the guide tube 93 within the barrel 90 and between the pulleys 102 and 103 the cable is wound about a drum 105 which is connected through a suitable gear box 106 to be driven by the motor 107. This arrangement of the operating cable is clearly seen in Figures 12 and 13.

From the above description it will be seen that when the motor 107 is operated in one direction it will move the cable 100 and the plunger 94 through the barrel 90 toward the die support D and when the motor is rotated in the opposite direction the plunger will be moved away from the die support.

In operation of the apparatus the plunger 94 is withdrawn to the upper end (right hand end in Figures 12 and 13) of the barrel 90 and a tube 87 is pushed over the edge of the table 88 into the barrel 90. The motor 107 is then started by a suitable control switch (not shown) at the operator's position and the plunger 94 will be fed toward the die as long as the switch is held closed, pushing the tube 87 over the mandrel rod. When the end of the plunger 94 extends slightly beyond the face of the die support D and the tube is in position to be dropped down into alignment with the die the control switch is closed and an automatic limit switch 108, which is driven by chain 109 from the shaft of the drum 105 becomes effective to control the plunger returning operation of the motor 107. This limit switch 108 is preferably so designed that it will reverse the motor 107 causing the plunger 94 to be withdrawn to its extreme position at the upper end of the barrel 90 and then stop the motor so that the loading device will be in condition to push the next tube over the mandrel when the operator next closes the control switch. The details of the limit switch 108 and the control switch are not shown as they form no part of the present invention and the desired results might be accomplished in a number of ways, evident to those skilled in the art.

In Figure 13 the drive motor 110 for the cable which returns the gripping buggy G is also illustrated. This motor 110 drives a drum 111 through a gear box 112 and is connected to a control switch 113 by chain or belt 114. In order to simplify the illustration of the apparatus and make it more clearly understandable the gripping buggy and its chain and track are not illustrated in Figures 12 and 13, but it will be understood by those skilled in the art that this device operates in the customary manner whereby the gripping buggy G (see Figure 2) may be moved forward into position to grip the end of the tube which projects through the die and then moved back away from the die during the drawing operation.

The controls for the motors 107 and 110 are led to the operator's position adjacent the die stand D and as the tube feeding rack, operating lever 96 and the hand wheels 43 and 48 for adjusting the positions of the mandrels are also located adjacent the die stand D, it will be seen that I have provided an apparatus which may be readily controlled by one man. It will be understood that the particular mode of operating the plunger 94 and the arrangement of limit switches, etc., described may be modified if it is desired to control the movement of the plunger 94 in the barrel 90 in some other manner. It will also be understood that although I have illustrated and described in detail a specific embodiment of my invention, modifications and variations may be made in the form of the apparatus employed without departing from the spirit of the invention. I do not, therefore, wish to be limited to the particular arrangement herein shown and described, but claim as my invention all embodiments thereof coming within the scope of the appended claims.

I claim:

1. In a draw bench for tubes, pipes and the like, the combination of a die, a pair of mandrel rods, anchor means for holding said mandrel rods in position relative to said die, elevator means for simultaneously raising one of said mandrel rods in an arcuate path out of alignment with said die into loading position with the mandrel end elevated above said die and lowering the other mandrel rod in an oppositely arcuate path from substantially the same loading position into alignment with said die, and means for supporting a tube in alignment with a mandrel rod in said loading position and moving said tube axially over the mandrel rod which is in said elevated loading position.

2. In a draw bench for tubes, pipes and the like, the combination of a die, a pair of mandrel rods, anchor means for holding said mandrel rods in position relative to said die, elevator means for simultaneously raising one of said mandrel rods in an arcuate path out of alignment with said die into loading position with the mandrel end elevated above said die and lowering the other mandrel rod in an oppositely arcuate path from substantially the same loading position into alignment with the die, and means for supporting and moving a tube axially over a mandrel rod when in said elevated loading position, said tube supporting and moving means including a barrel having an end opening disposed in alignment with said loading position for said mandrel rods and having a side opening extending lengthwise thereof, a plunger in said barrel and means for moving said plunger in said barrel.

3. In a draw bench for tubes, pipes and the like, the combination of a die, a pair of mandrel rods, anchor means for holding said mandrel rods in position relative to said die, elevator means for simultaneously raising one of said mandrel rods out of alignment with said die into loading position with the mandrel end elevated above said die and lowering the other mandrel rod from substantially the same loading position into alignment with said die, and means for supporting and moving a tube axially over a mandrel rod when in said elevated loading position, said tube supporting and moving means including a rack having means for moving tubes transversely thereover, a barrel supported at one side of said rack and disposed substantially in alignment with the elevated loading position of said mandrel rods, said barrel having an elongated opening adjacent said rack whereby tubes may be moved into said barrel from said rack, a plunger in said barrel, a cable secured to said plunger and extending longitudinally of said barrel, means for guiding said cable externally of said barrel, and independently operable means for moving said cable whereby said plunger may be moved axially of said barrel until one end of said plunger extends beyond the end of said barrel to eject a tube therefrom.

4. In a draw bench for tubes, pipes and the like, the combination of a die, a pair of mandrel rods, anchor means for holding said mandrel rods in position relative to said die, elevator means for simultaneously raising one of said mandrel rods out of alignment with said die into loading position with the mandrel end elevated above said die and lowering the other mandrel rod from substantially the same loading position into alignment with the die, and means for supporting and moving a tube axially over a mandrel rod when in said elevated loading position, said tube supporting and moving means including a rack having means for moving tubes transversely thereover, a barrel supported at one side of said rack and disposed substantially in alignment with said elevated loading position of said mandrel rods, said barrel having an elongated opening adjacent said rack whereby tubes may be moved into said barrel from said rack, a plunger in said barrel, a cable secured to said plunger and extending longitudinally of said barrel, means for guiding said cable externally of said barrel, and means for moving said cable whereby said plunger may be moved axially of said barrel until one end of said plunger projects beyond the end of said barrel to eject a tube therefrom and to return to the opposite end of said barrel from said mandrel rods.

5. In a draw bench mechanism of the type described, a pair of mandrel rods, and means for supporting said mandrel rods including a pair of adjacent trough members in which said rods lie and interconnected elevator means for supporting said troughs whereby said rods and troughs may be moved simultaneously to elevate one trough and rod in an arcuate path from a drawing position into a loading position and lower the other trough and rod in an oppositely arcuate path from substantially the same loading position into substantially the same drawing position.

6. In apparatus of the type described, a pair of mandrel rods, a pair of trough like supports for said rods, a centrally pivoted arm, means for pivotally securing one of said troughs to one end of said arm and means for pivotally securing the other trough to the other end of said arm, means for oscillating said arm whereby lifting and lowering motion may be imparted to said troughs, and means for imparting an arcuate movement to said troughs whereby the upper and lower positions of each trough are substantialy the same.

7. In a draw bench for tubes, pipes and the like, the combination of a die, a pair of mandrel rods, anchor means for holding said mandrel rods in position relative to said die, elevator means for supporting one of said mandrel rods out of alignment with said die in loading position with the mandrel end elevated above said die and, at the same time, supporting the other mandrel rod in drawing position in alignment with said die, said elevator means being operable to reverse the position of said rods whereby said one of said rods is moved into substantial alignment with the die and said other of said rods is lifted into substantially the same loading position, and means for supporting and moving a tube axially over a mandrel rod in said elevated loading position, said tube supporting and moving means including a barrel having an end opening substantially in alignment with the loading position of said mandrel rods and having a side opening extending lengthwise thereof, a plunger in said barrel, means for moving said plunger in said barrel, and means for loading a tube into said barrel through said side opening.

8. In apparatus of the type described, a pair of mandrel rods, a pair of supports for said rods, a frame, a pair of centrally pivoted arms mounted on said frame and disposed with their central pivots substantially in vertical alignment, a pair of connecting bar members, one of said bar members being pivotally secured to each of said arms on one side of the central pivots of said arms and the other of said bar members being pivotally connected to each of said arms on the other side of said central pivots, said mandrel rod supports being carried by said bar members, and means for oscillating said pivoted arms whereby arcuate lifting and lowering motion will be imparted to said supports and the positions of said troughs reversed without interference therebetween.

9. In apparatus of the type described, a pair of mandrel rods each having a mandrel at one end, a die, a tube supporting barrel disposed on the opposite side of said die from said mandrel rods, and elevator means for moving the mandrel end of one of said rods in an arcuate path from drawing position in alignment with said die into loading position in alignment with said barrel and simultaneously moving the mandrel end of the other of said rods in an oppositely arcuate path from said loading position into said drawing position.

10. In apparatus of the type described, the combination of a die, a pair of mandrel rods each having a free end adjacent said die, said rods being disposed on one side of said die, means for moving tubes over said free ends of said rods into drawing position including a tube supporting member disposed on the opposite side of said die from said rods, supports for the free ends of each of said mandrel rods and means for simultaneously moving said supports in arcuate paths transversely of the direction of tube movement whereby the positions of said free ends of said rods may be reversed and one rod moved from drawing position in alignment with said die into loading position relative to said tube support while the other rod is being moved from said loading position into said drawing position.

11. In apparatus of the type described, the combination of a die, a pair of mandrel rods each having a free end adjacent said die, said rods being disposed on one side of said die, means for moving tubes over said free ends of said rods into drawing position including a tube supporting member disposed on the opposite side of said die from said rods, supports for the free ends of each of said mandrel rods, means for simultaneously moving said supports in arcuate paths transversely of the direction of tube movement whereby the positions of said free ends of said rods may be reversed and one rod moved from drawing position in alignment with said die into loading position relative to said tube support while the other rod is being moved from said loading position into said drawing position, and means for drawing tubes through said die.

HOWARD W. SMITH.